Jan. 5, 1926.

T. R. GAUTIER 1,568,506

STRIP SERVING MACHINE

Filed May 20, 1924     5 Sheets-Sheet 1

Inventor:
Trevor R. Gautier,
by Emery, Booth, Janney & Varney
Attys

Jan. 5, 1926. 1,568,506
T. R. GAUTIER
STRIP SERVING MACHINE
Filed May 20, 1924 5 Sheets-Sheet 2

Inventor:
Trevor R. Gautier,
by Emery, Booth, Janney + Varney
Attys.

Jan. 5, 1926. 1,568,506
T. R. GAUTIER
STRIP SERVING MACHINE
Filed May 20, 1924 5 Sheets-Sheet 3

Inventor:
Trevor R. Gautier
by Emery, Booth, Janney & Varney
Attys Jan. 5, 1926. 1,568,506

T. R. GAUTIER

STRIP SERVING MACHINE

Filed May 20, 1924 5 Sheets-Sheet 4

Inventor:
Trevor R. Gautier,
by Emery, Booth, Janney & Varney
Attys.

Jan. 5, 1926.　　　　　　　　　　　　　　　1,568,506
T. R. GAUTIER
STRIP SERVING MACHINE
Filed May 20, 1924　　　5 Sheets-Sheet 5

Inventor:
Trevor R. Gautier.
by Emery, Booth, Janney & Varney Attys

Patented Jan. 5, 1926.

1,568,506

UNITED STATES PATENT OFFICE.

TREVOR R. GAUTIER, OF NASHUA, NEW HAMPSHIRE, ASSIGNOR TO NASHUA GUMMED & COATED PAPER COMPANY, OF NASHUA, NEW HAMPSHIRE, A CORPORATION OF MASSACHUSETTS.

STRIP-SERVING MACHINE.

Application filed May 20, 1924. Serial No. 714,592.

*To all whom it may concern:*

Be it known that I, TREVOR R. GAUTIER, a citizen of the United States, and a resident of Nashua, in the county of Hillsborough and State of New Hampshire, have invented an Improvement in Strip-Serving Machines, of which the following description, in connection with the accompanying drawings, is a specification, like characters on the drawings representing like parts.

This invention relates to strip serving machines, and more particularly to machines for serving strips of adhesive or gummed tape for immediate application by the operator to a package, box or the like. In certain aspects thereof, it is an improvement upon the construction shown in my co-pending application Serial No. 643,907, filed June 7, 1923.

In order that the principle of the invention may be readily understood, I have disclosed certain embodiments thereof in the accompanying drawings, wherein—

Fig. 3ª is a detail sectional view on the line 3ª—3ª of Fig. 3;

Fig. 4ª is a front elevation of a somewhat modified form of cutter that may be employed by me under certain conditions;

Fig. 10ª is a view similar to Fig. 10 but showing the parts positioned ninety degrees therefrom;

My invention so far as the type thereof shown in Figs. 1 to 14 is concerned, is an improvement upon the strip serving machine shown in the United States patent to Mortimer No. 1,384,082, July 12, 1921, and the patent to Emmert, No. 1,442,058, January 16, 1923, and is an improvement upon the construction shown in my co-pending application Serial No. 643,907.

The machine of my invention is intended to feed, cut, moisten and deliver strips of tape in adhesive condition to an operator for immediate manual application by him to the package to be sealed. Such machines are well known in the art. They are intended for rough general use, and in stores are in almost constant use. It is therefore highly important that the construction of the machine be such as to prevent breakage or disarrangement of parts necessitating delay or interruption in the use thereof.

An important object of my invention, particularly so far as the construction shown in Figs. 1 to 14 is concerned, is to improve the general structure of such a machine in a number of ways having such end in view.

As the preferred embodiment of the invention, I have disclosed a machine of the general type shown in the said patents, but obviously my invention as to certain features at least, may be used in other types of strip serving machines. The features herein disclosed are, however, peculiarly adapted for use in connection with the mechanism of the disclosed type.

Figures 5, 6, 7, 8, 9, 10, 10A:
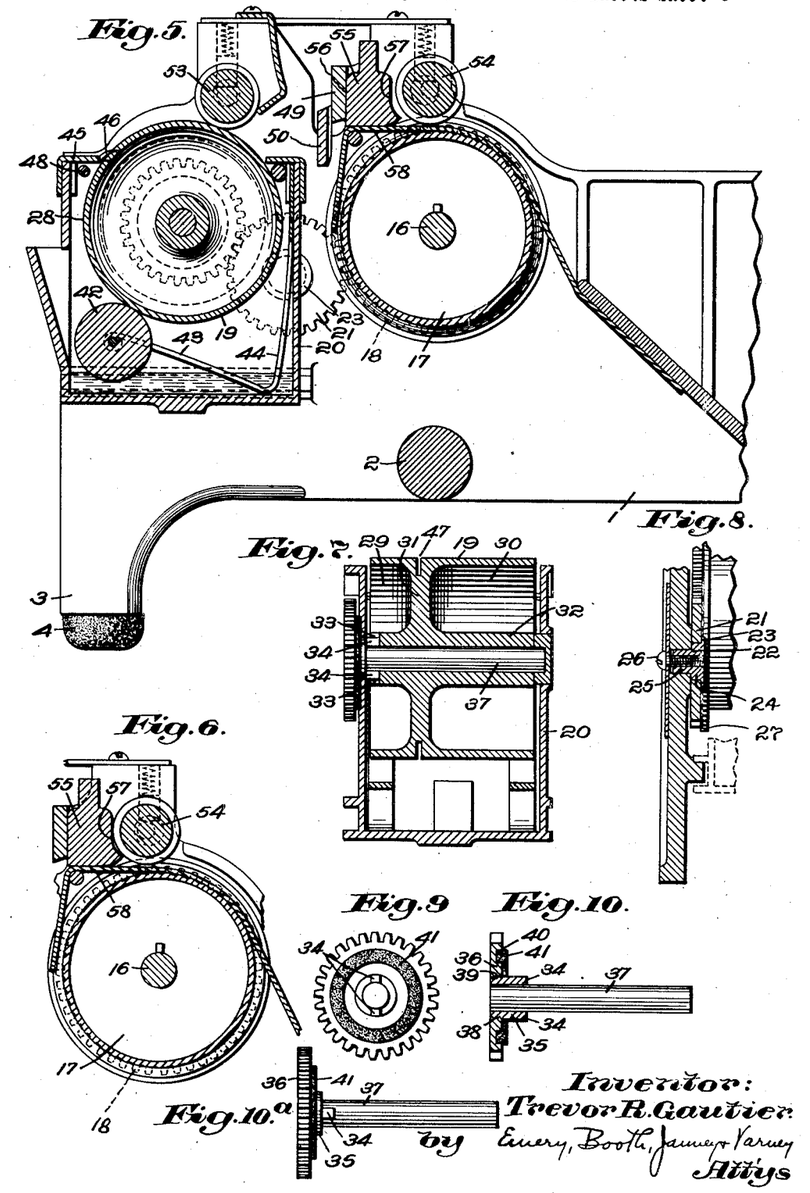
Fig. 5 is a vertical longitudinal section taken through the forward part of the machine.
Fig. 6 is a vertical section taken through the feeding rolls and being similar to a portion of Fig. 5, but representing the parts in the position occupied during feeding of the strip.
Fig. 7 is a vertical transverse section taken through the moistener roll and reservoir.
Fig. 8 is a detail in vertical section showing the means for supporting the moistener driving roll and parts associated therewith.
Fig. 9 is a side elevation of the gear upon the shaft of the moistener.
Fig. 10 is a longitudinal section taken through said gear and the parts whereon it is supported.

Referring more particularly to the drawings, the frame or housing of the machine is represented at 1 in the several figures, it having opposite side castings which are suitably connected at the bottom and rear, as by tie members, one of which is shown at 2 in Fig. 5. The housing is preferably provided with feet 3, which are rubber shod, as indicated at 4. Within the rear portion of the frame or housing between the side walls thereof is received a roll 5 of desirably previously gummed paper tape indicated in Fig. 1, although my invention may be applied in certain aspects thereof to machines wherein an ungummed strip is fed from a roll past a suitable gum or adhesive applying device. Desirably, however, the strip is previously gummed and is fed past the moistener.

Figure 15:
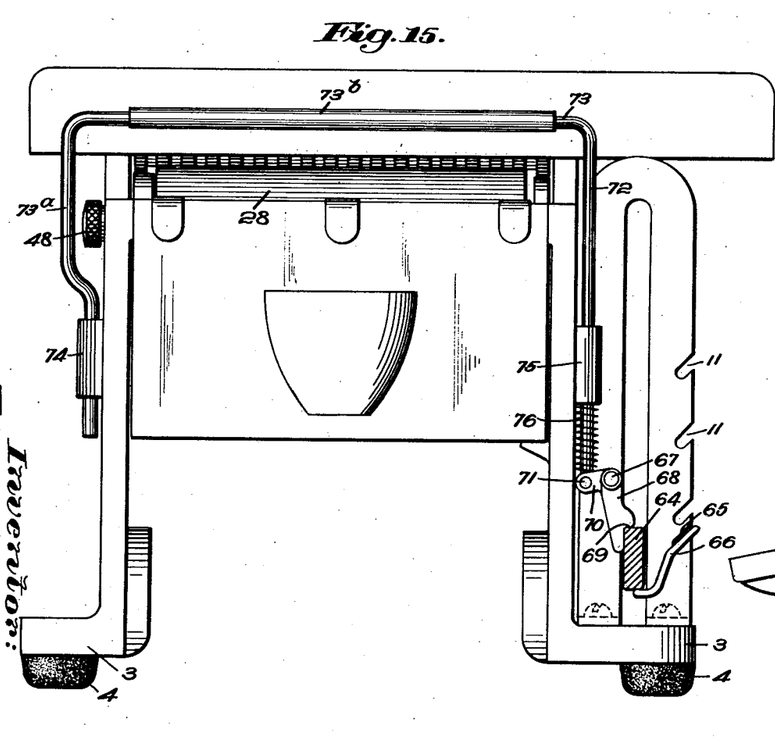
Fig. 15 is a front elevation of another form of my invention, and one which is particularly adapted to the feeding of any desired length of strips.
Figure 16:
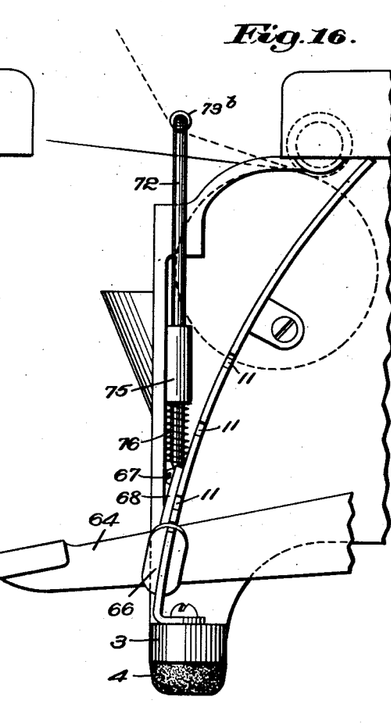
Fig. 16 is a side elevation of the forward end of the strip serving device shown in Fig. 15.

The strip may be of any suitable width, but in the form of the invention shown in Figs. 1 to 14, the strip is or may be relatively narrow, whereas the strip employed with that form of my invention shown in Figs. 15 and 16 is preferably wide, though not necessarily so.

It is desirable that one edge of the strip should be in fixed relation or alignment with the corresponding end of the feed roll. Therefore, I desirably employ means not herein disclosed, but fully shown in my said co-pending application, for holding the strip roll 5 against the inner face of one of the walls of the machine. Such means may be in the form of a disk or plate carried by a spindle indicated at 6 in Fig. 1 as extending through an opening in the wall of the housing and adapted for longitudinal adjustment in said wall. The construction is such as to effect the holding of the roll or package firmly against one wall of the housing, but permitting the paper to be fed by the feeding means readily and yet with sufficient friction or tension.

The feeding means may be and desirably is of the general type shown in said patents to Mortimer and Emmert and shown in my said co-pending application.

As shown most clearly in Figs. 1 to 6 inclusive, there is provided a hand operated or feed lever 7 pivoted at 8 upon a lateral hub or projection from the housing, it being provided with a strong coil spring 9 to permit ready manual operation. The forward end of the lever is guided in its downward movement in a slotted member 10, the slot being of sufficient length to permit full movement of the lever, and thereby to feed a sufficient length of the strip. Any suitable means may be provided for limiting the length of strip, however fed and severed. I have herein represented for the purpose the said guide as having a plurality of downwardly inclined, open-ended notches 11, in any one of which may be readily positioned a looped member 12, the lower end of which in any position underlies the edge 13 of the lever 7. Said lever 7 is provided with an internal curved rack 14 which meshes with a pinion 15 upon the end of the shaft 16 of the feed roll 17. The construction is desirably such as to permit slight downward movement of the movable severing blade before the feeding of the strip commences, thereby to bring said blade below the feeding plane of the strip.

Figure 3:
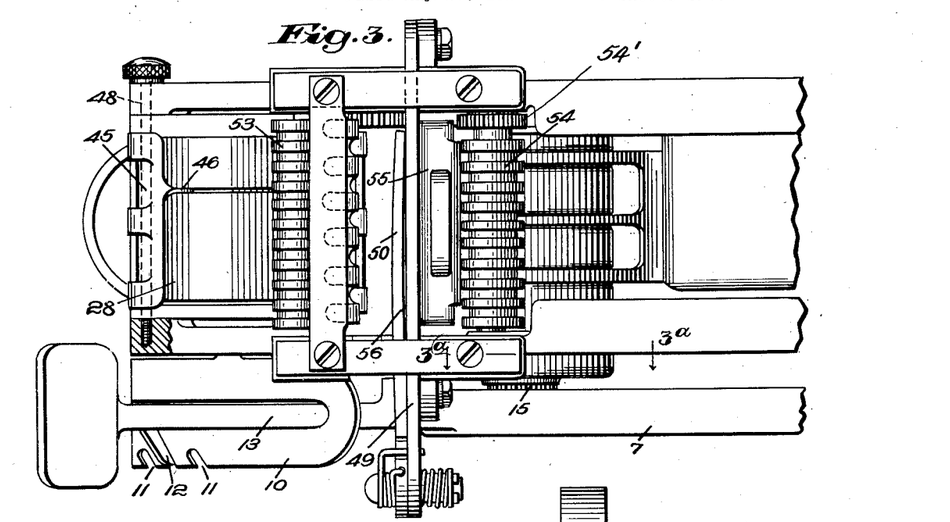
Fig. 3 is a plan view of the forward end of the machine, the cover of Fig. 2 being removed.

Said construction, permitting a non-feeding or non-actuating downward movement of the lever 7 of a predetermined extent may be of any suitable character, herein shown as substantially similar to that disclosed in said patent to Emmert. Said pinion 15 which meshes with the curved rack 14 is loose upon the feed roll shaft 16. Referring to Fig. 3ª there is secured to said pinion 15 and also loose upon said shaft 16 a suitable pawl carrying member capable of being rotated to effect revolving movement of the pawl. Said pawl carrying member is shown as a cylindrical cap 15ª within and near the periphery of which is pivotally supported a spring pressed pawl 15ᵇ adapted yieldingly to engage the ratchet 15ᶜ the latter also being loosely mounted upon the shaft 16. Upon said ratchet are projecting lugs 15ᵈ, 15ᵈ adapted to engage a pin 16ª carried by and projecting at opposite sides of the shaft 16. Said lugs are engageable with said pin in either direction of rotation of the ratchet. The mechanism described is in effect a lost motion connection between the strip feeding means or feed roll and the lever 7 constituting the actuating means therefor.

In operation when the lever arm 7 is depressed, the rack 14 actuates the pinion 15 which in turn rotates the pawl carrying member 15ª in a clockwise direction, viewing Fig. 3ª, thus revolving the spring pressed pawl 15ᵇ. Said pawl moves the ratchet 15ᶜ without actuating the shaft 16 until the projecting lugs 15ᵈ engage the pin 16ª. The parts are so arranged that during this lost motion period in which the ratchet moves relatively to the shaft 16 the movable blade 50, hereinafter more fully described is released into position clear of and herein below the service path of the strip of tape. Subsequent or continued downward movement of the lever arm 7 will cause the projecting lugs 15ᵈ to bear against the pin 16ᵃ and thus rotate the shaft 16 which in turn rotates the feed roll 17 to feed the strip forward.

Figures 3A, 4:
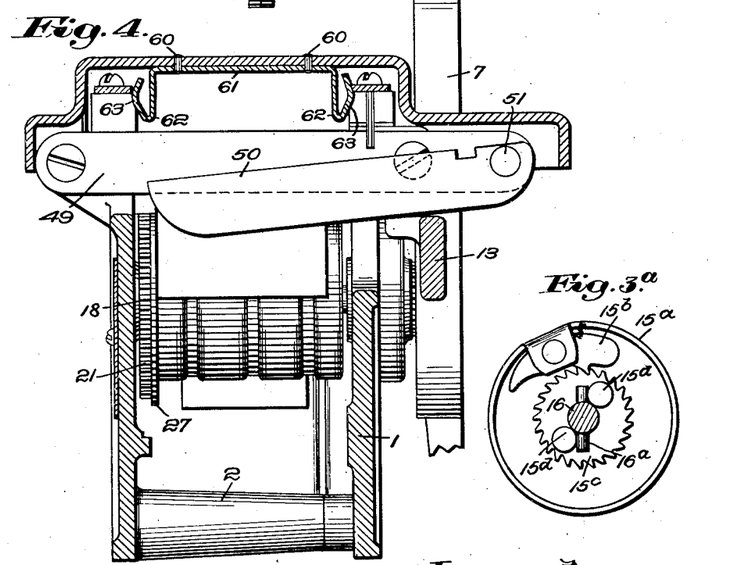
Fig. 4 is a vertical cross section taken through the said cover and the parts beneath.

The feed roll 17 may be of any suitable size and is preferably formed as a drum or hollow metallic member which at its end opposite the lever 7 is provided with a gear 18 shown most clearly in Fig. 4. The said gear is intended to rotate the moistener roll 19, which is carried in a suitable reservoir 20, as hereinafter more fully described. Inasmuch as for the best construction the reservoir 20 should be removable from the machine, it is evident that means should be provided permitting such removal of the reservoir with the least disassembling of the parts, and particularly without disarrangement of gearing. I have therefor provided an intermediate gear 21 shown most clearly in Figs. 5 and 8, which meshes with and is driven by the gear 18 on the feed drum or roll. The said gear 21 is desirably supported loosely upon a stud 22 having a flange 23 overlying the inner face of said gear, so as to confine it in position. Said stud is provided with an enlarged or hub portion 24 (see particularly Fig. 8) upon which the gear 21 is directly received and with a portion 25 of smaller diameter received directly in the wall of the housing. The said stud is hollow and is threaded for the reception of a short screw 26, which is placed in position from the outside, so as to engage the stud 22 which is placed in position from the inside. The said stud 22 cooperates with an annular flange 27 (see also Fig. 4) which is carried by the feed drum or roll just inside the gear 18 thereof. Said flange also acts as a guide for the edge of the paper.

It is important that as much water as possible be carried by the reservoir 20. The capacity of the reservoir cannot well be increased, and under former constructions, such as shown in the said patents, the moistener roll of porous material was necessarily solid, and hence occupied a very large part of the volume of the reservoir. In accordance with my present invention, I make the moistener roll hollow at its ends as indicated at 29, 30, so that a relatively large quantity of water may find its way into the interior of the moistener roll and remain therein until the level of the water falls below the lower surface of the moistener roll. Another important feature of the moistener roll disclosed herein is that the peripheral surface thereof is extremely true and free of irregularities and moreover the roll is very light. As shown, the said roll is provided with a web like circular portion 31 extending from the hub 32 to the periphery thereof. The described construction and attendant advantages are best, if not solely, obtainable by making the roll metallic, as illustrated. My invention however is not limited to the particular type of moistening means disclosed.

Heretofore there has been difficulty in providing simple means for securing such a driving relation between the moistener roll and the gear therefor that slip and lost motion do not occur, and whereby the conections may be permanent but readily separable. I have solved the problem in the following manner.

The hub 32 which is desirably formed integrally with the moistener roll is provided at one end with notches 33, 33, within which are received keys 34, 34, oppositely positioned upon a sleeve 35 which is secured by welding, sweating or some other manner fixedly in the gear 36 and also upon the shaft 37 of the gear. In addition, the sleeve 35 is threaded as indicated at 38 into the threaded axial opening 39 in the gear 36, and the directions of the threads 38, 39 are such that if in use the sleeve 35 becomes detached from the gear 36, the enforced rotation of the gear through the gear 21 will act merely to tighten the threads in place.

In order to prevent seepage of water along the shaft 37 to the outside of the reservoir, I desirably provide the inner face of the gear with an annular grove 40 within which I secure ring like packing 41 to contact at all times with the outer adjacent stationary surface of the reservoir 20.

Desirably I provide means such as shown in my said application for feeding water to the moistener roll 19. Such means, which need not be herein more fully described, is indicated as a roll 42 of the length of the moistener and mounted for rotation upon a suitable supporting spring frame indicated generally at 43 and having upwardly extending arms 44 secured at their upper end to the rear wall of the reservoir. Such frame may be detachably secured in position by any suitable means, such, for example, as that shown in my co-pending application.

Desirably the front wall of the reservoir supports a clip member 45 having a projection 46 to enter a peripheral groove 47 upon the moistener roll indicated most clearly in Fig. 7.

The reservoir is desirably held removably in position by means similar to that shown in my said copending application, and hence not herein described in detail. Generally speaking, such means includes a rod 48 which passes through aligned openings in the side walls of the frame or housing and the adjacent side walls of the reservoir, whereby the said walls may be sprung or forced together so as firmly to hold the reservoir in position, yet permitting ready disassembling of the parts.

The strip severing means is desirably of the same general type and construction as shown in my said copending application and need not be described in detail. It includes a fixed plate 49 and a movable blade 50 pivoted at 51 and adapted to be operated by the return movement of the strip feeding lever 7, 13. If desired, the upper edge of the pivoted strip severing blade may be straight, as indicated in Fig. 4, or it may be recessed as shown at 52 in Fig. 4ª. Such recessed or depressed cutting edge is desirable under certain conditions, as it insures the immediate removal of the severing blade downwardly well below the service path of the strip, thereby preventing all danger of the edge of the movable blade remaining in the service path of the strip and causing the strip to buckle.

Desirably I provide means such as disclosed in my said copending application, whereby the initial impact in the movement of the severing blade, is not taken by such blade, and I preferably provide means such as shown in said copending application for cushioning the impact of the severing blade. The machine is preferably provided in its side walls with lateral openings constituting bearings or supports for two rolls 53, 54, indicated most clearly in Fig. 5 and corresponding generally to those shown in my said co-pending application. The said rolls are desirably metallic and are preferably circumferentially grooved as indicated. The roll 53 acts to hold the strip down upon the moistener roll 19 and is desirably vertically yielding, as shown in said copending application. Desirably the bearing openings for both of said rolls are enlarged, and particularly that for the roll 54, for a purpose to be described. Said roll 54 has fast thereon at one end inside the wall of the framing or housing a pinion 54' (Fig. 3) which directly meshes with the large gear 18 upon the feed roll.

Instead of providing, as in my said copending application, a metallic strip at the side of the roll 54, I desirably provide a metallic member 55 of suitable weight which is of the full length of the said roll 54 and is positioned between the side walls of the frame or housing, so as to fit snugly in position, but in such way as to permit ready removal. The face 56 of said member 55 is desirably straight so as to fit against the adjacent face of the stationary severing blade 49, and the opposite face of the member 55 is curved as indicated at 57 to correspond generally to the curvature of the roll 54.

Owing to the fact that the bearing openings for the roll 54 are considerably enlarged, it will be evident that when forward feeding movement is imparted to the feed roll 17, the teeth of the gear 18 of said roll being in engagement with the gear 54' upon the roll 54 will move said roll forwardly until it grips the member 55, or at least comes into sufficient proximity to prevent the ready displacement or removal of said member 55. The member 55 is, as stated, comparatively heavy and serves to hold the strip down and directly between the severing blades, and yet the member can be very readily removed to permit cleaning of the parts.

Below the weight 55 I desirably provide a metallic strip-like member 58 similar to those shown in my said co-pending application.

Figures 1, 2, 4A:
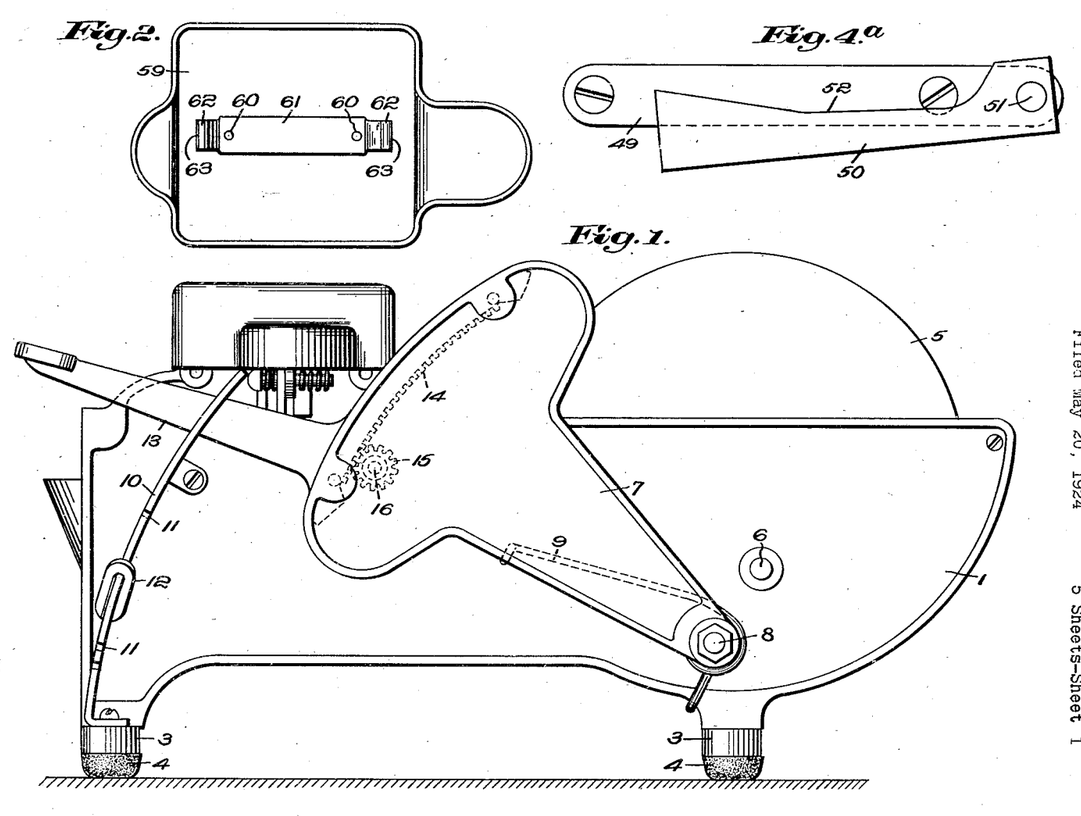
Fig. 1 is a side elevation of a strip serving machine embodying my invention.
Fig. 2 is an under side plan view of a cover for a part of the machine.

In Fig. 2, I have represented at 59 a cover for a part of the mechanism. Such cover is of the general construction shown in my said co-pending application, but differs in that at its under face it has secured thereto by rivets 60 a spring 61 having inwardly bent ends 62, 62 both terminating in upwardly extending yielding ends 63, 63, which engage the adjacent parts of the walls of the frame, and thus tightly yet removably hold the cover in position.

In Figs. 11 to 14, I have illustrated another feature of my invention, and which, if desired, may be employed in conjunction with the form of strip serving machine already described, and also with the form shown in Figs. 15 and 16. In a strip serving machine of the disclosed type, provided with strip severing means, the movable blade 50 passes across the service path of the strip in performing the severing operation. It is desirable that said blade be removed from its position in the service path of the strip prior to further feeding of the strip, in order to prevent buckling or obstruction of the strip by its contact with said movable blade. Such removal of the movable blade may be facilitated by the provision of a materially recessed blade as shown in Figs. 4ª and 14. Also the construction is preferably such that a non-feeding downward movement of the feed lever is afforded, of the extent necessary to drop the blade, said non-feeding movement being permitted by means of the lost-motion or similar mechanism already described (see Fig. 3ª) and disclosed in said patent to Emmert. In said patent, as in Figs. 1 and 10ª of the present application, the feed lever normally rests at the top of its throw, with the blade blocking the service path of the strip and the non-feeding movement and dropping of said blade must take place as the first step in the operation of the strip serving machine.

In the construction shown in Figs. 11 to 14, however, the non-feeding downward movement of the feed lever and dropping of the blade, or any desired portion of such movement, occurs at the end of the strip serving operation, immediately after the strip is severed. The movable blade accordingly has a normal or rest position below and clear of the service path of the strip and no preliminary non-feeding downward movement of the lever is necessary; the feeding of the strip may therefore commence immediately and as the first step in the strip serving operation with resulting quicker delivery of the strip. In said Figs. 11 to 14 the construction is the same as in the figures already described, except as specifically stated.

Figure 11:
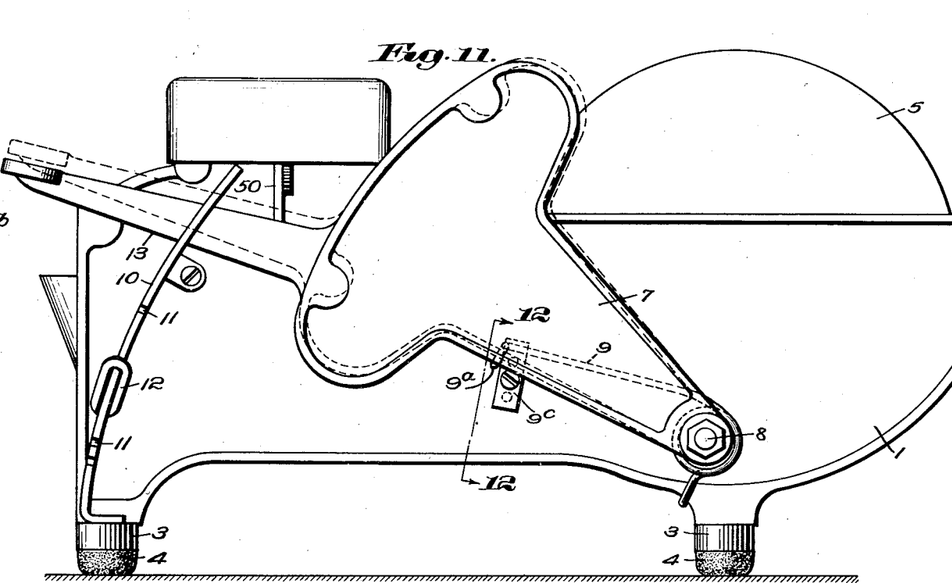
Fig. 11 is a side elevation of a strip serving machine similar to that shown in Fig. 1 and illustrating an additional feature of my invention.
Figure 12:
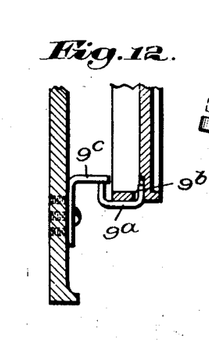
Fig. 12 is a detail sectional view on the line 12—12 of Fig. 11.
Figure 13:
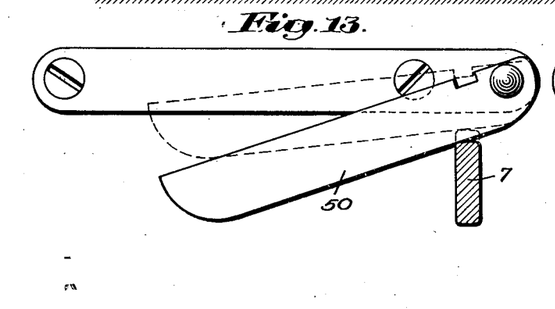
Figs. 13 and 14 are front elevations of the cutters such as shown in Figs. 4 and 4ª respectively and illustrating two positions of the same when employed in connection with the machine shown in Fig. 11.
Figure 14:
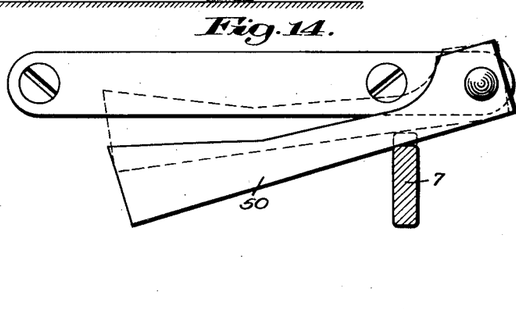

Viewing Figs. 11 and 12, the spring 9 for returning the feed lever 7 is provided near its free end with a laterally extended portion 9ª preferably bent to form a seat for the lower edge of said lever but permitting the latter at times to move relatively to said spring. Desirably said spring has an upset portion 9ᵇ received in a suitable recess in the lower face of said lever, said upset portion and recess being of the proper length to permit the required extent of relative movement of the spring and lever but preventing them from becoming displaced.

Positioned in the path of movement of said spring 9 is a stop 9ᶜ rigidly supported in any suitable manner and shown as secured to the side face of the frame or housing 1 of the machine as by means of a screw or the like. Said stop is so positioned as to engage and arrest the spring during the upward or return throw of the lever and prior to the time when the movable blade 50 begins to cross the service path of the strip to sever the same. Further upward movement of the spring is thus prevented but the lever 7 under the impulse received from the spring and by its own momentum may continue its upward movement, completing the operation of the movable blade and effecting the severing of the strip. When at the top of its throw, as indicated in dotted lines, Figs. 11, 13 and 14, said lever is unsupported by the spring and will immediately drop back until again in contact therewith thereby permitting the movable blade to drop below the service path of the strip.

Said position, which may be termed the normal or rest position of the lever 7 and of the movable blade 50 is that shown in full lines in Figs. 11 to 14. In such position it will be noted, particularly by reference to Figs. 13 and 14, that said movable blade lies entirely clear of and herein below the service path or plane of movement of the strip. Starting from said position, if the lever be depressed, the feeding of the strip may, if desired, be begun at once without danger of obstruction of the same by the movable blade. In other words, the non-feeding downward movement of the lever to allow the blade to clear the service path has already taken place at the end of the previous cycle of operations. When the lever is released at the end of its feeding or downward movement, said lever and the spring 9 move upwardly in unison until the spring contacts the stop 9ᶜ, whereon the lever continues and completes its upward throw, effects the severing of the strip and immediately returns to its described normal position and wherein the movable blade lies below the path of the strip.

Desirably the stop 9ᶜ is adjustable to vary the normal or rest position of the lever 7 in accordance with the strength of the spring or other particular circumstances. Herein for the purpose I have shown a plurality of tapped holes in the frame 1, seen in Figs. 11 and 12. By adjusting said stop the extent of drop back of the lever may be varied so as to equal in extent the whole or the desired portion of the possible non-feeding downward movement of the feed lever. Said stop also may serve to retain the spring 9 in position upon the machine if for any reason it is desired to remove the feed lever, thereby facilitating the disassembling and assembling of the parts.

In Figs. 15 and 16, I have shown a portion only of a strip serving device, as the remainder thereof may be and desirably is of the same construction as that shown in Figs. 1 to 12, excepting that the parts may be proportionately larger, if necessary, to fit the wider strip. It will be understood, however, that this part of my invention is adapted to the feeding of a strip of any width, but is especially advantageous in the feeding of a wide strip.

The purpose of this part of my invention is to provide means by which the operative may readily secure any desired length of strip, even markedly in excess of the length of strip that could be fed by the normal action of the feeding means and without adjustment of the feeding means. In other words, it is desired to provide means whereby the operative may draw out variable lengths which are or may be in excess of the maximum length that may be delivered by the feeding mechanism, and without constant adjustment of the parts.

To this end, I have represented the following means which constitutes one form or type only of means that may be provided to this end.

In said Figs. 15 and 16 is shown a very wide strip serving device, though, as stated, the invention may be employed with any length of strip. The feeding means and the severing means may be such as shown in Figs. 1 to 12, and means may be provided as there shown for limiting the downward movement of the feeding means. In said Figs. 15 and 16 the arm of the feed operating lever is indicated at 64, and there is shown a special notch 65 below the other notches, wherein the stop 66 may be positioned. If the operative desires to obtain a strip longer than would be provided merely by moving downward the feeding lever and permiting the same to return after striking the stop 66, he utilizes means, one embodiment of which is here shown. Upon some suitable part of the framing, as, for example, at 67, adjacent to the path of the operating lever 64, there is pivoted a pawl 68 having a shoulder 69 adapted to engage the upper edge of the operating lever 64 and prevent its return. The pawl or trigger 68 has attached thereto or formed therewith an arm 70 extending from the opposite side of the pivot 67 and pivotally connected at 71 to the downwardly depending arm or portion 72 of the yoke-like member 73, which has at the opposite side of the machine a depending arm or portion 73ᵃ guided in some suitable way at 74. The arm 72 is likewise suitably guided at 75 and between said guide and the pivot 71 is provided a coil spring 76.

The part 73ᵇ is desirably a roll loosely mounted upon the yoke itself, and it lies above the service path of the strip, but so close thereto and in such position that the operative may by an upward movement or deflection of the strip move the yoke 73 upwardly, and thereby release the pawl 68, so as automatically to release the feed arms 64, which is thereupon moved upward under the stress of the spring 9 of Fig. 1, and thereby severs the strip.

It will be understood that in using this portion of my invention, the operative presses downward the feeding lever until it reaches the position shown in Fig. 15, where it is automatically held by the pawl or trigger 68. The operative then seizes the protruding end of the tape and draws upon the same until the desired length has been secured, and thereupon he gives an upward deflection to the tape as described, thereby releasing the feeding arm 64 from the pawl or trigger 68 and effecting the automatic severance of the desired length of tape. Obviously the operative may in this manner and without adjustment of parts secure any desired length of tape, which desired length may be in excess of the maximum length which can normally be fed by the machine, or which may be in excess of any shorter length provided for by any other position of the stop 66 and of the pawl or trigger 68, which may be mounted in any desired position of vertical adjustment with capacity for connection by lengthwise adjustment with the yoke 73.

Having thus described certain illustrative embodiments of my invention, I desire it to be understood that although specific terms are employed, they are used in a generic and descriptive sense and not for purposes of limitation, the scope of the invention being set forth in the following claims.

Claims:

1. In a machine for serving strips of adhesive tape, a frame or housing having opposite side walls and with provisions for supporting a package of tape, tape feeding means, tape severing means, a reservoir having a rotatable moistener for the tape, a gear co-axial with the moistener, a gear 21 between the feeding means and the moistener gear to impart rotation to the latter, and supporting means for the gear 21 including a stud 22 provided with a flange 23 overlying the inner face of the gear 21, and means to support said stud 22 in position.

2. In a machine for serving strips of adhesive tape, a frame or housing having opposite side walls and with provisions for supporting a package of tape, tape feeding means, tape severing means, a reservoir having a rotatable moistener for the tape, a gear co-axial with the moistener, a gear 21 removably supported against one of the side walls of the frame or housing, a stud 22 for removably supporting said gear and itself having a flange 23 overlying the inner face of the gear 21 to confine it in position.

3. In a machine for serving strips of adhesive tape, tape moistening means including a reservoir, a moistener roll supported for rotation in said reservoir, said roll including a relatively thin peripheral portion having a strip-contacting surface, a supporting hub, and a supporting web extending therefrom to said peripheral portion but of limited thickness whereby a roll is provided having one or more hollow ends adapted to receive the liquid of the reservoir interiorly thereof, stripper means, and an annular groove in the peripheral portion of said roll for cooperation with said stripper means, said groove and said supporting web being positioned in the same diametral plane through said roll whereby the peripheral portion of the roll may be made thin although grooved in the manner described.

4. In a machine for serving strips of adhesive tape, a frame or housing having opposite side walls and with provisions for supporting a package of tape, tape feeding means, tape severing means, a reservoir having a rotatable moistener for the tape, a gear co-axial with the moistener, a moistener roll having a smooth strip-contacting surface, said roll being hollow and adapted to receive water of the reservoir interiorly thereof, said roll having a supporting hub, a shaft within said hub, a reservoir in the walls of which said shaft is supported, a gear upon said shaft outside the reservoir, and connections between said gear, shaft and hub including notches in the hub receiving keys upon said shaft.

5. In a machine for serving strips of adhesive tape, a frame or housing having opposite side walls and with provisions for supporting a package of tape, tape feeding means, tape severing means, a reservoir having a rotatable moistener for the tape, a gear co-axial with the moistener, a moistener roll having a smooth strip-contacting surface, said roll being hollow and adapted to receive water of the reservoir interiorly thereof, said roll having a supporting hub, a shaft within said hub, a reservoir in the walls of which said shaft is supported, a gear upon said shaft outside the reservoir, and connections between said gear, shaft and hub, a sleeve 35 fast with said gear and having keys adapted to enter notches in said hub, said gear and sleeve having a threaded connection.

6. In a machine for serving strips of adhesive tape, a frame or housing having opposite side walls between which a package or roll of tape may be positioned for feeding movement, a tape feeding means in advance of said package, tape moistening means and a severing blade for the strip, said blade having a severing edge which is recessed so as to remove said edge from the normal service path of the strip.

7. In a machine for serving strips of adhesive tape, a frame or housing having opposite side walls providing a space between them for supporting a package of tape in position to be drawn upon, a reservoir adapted to be received and supported upon said side walls, a moistener in said reservoir, tape feeding means between the tape package and said reservoir, and a pair of severing blades, one of which is movable toward and from the service path of the strip and markedly recessed or cut away, so that when the blade is in its non-severing position, it is substantially removed from the service path of the strip.

8. In a machine for serving strips of adhesive tape, a frame or housing having opposite side walls providing a space between them for supporting a package of tape in position to be drawn upon, strip feeding means, strip severing means and guiding means for the strip operatively positioned with respect to the feeding means, and including a weighted, readily removable member above the service path of the strip.

9. In a machine for serving strips of adhesive tape, a frame or housing having opposite side walls providing a space between them for supporting a package of tape in position to be drawn upon, strip feeding means, strip severing means and guiding means for the strip operatively positioned with respect to the feeding means, and including a removable, weighted member above the service path of the strip and adapted to engage the upper surface of the strip and to guide the same.

10. In a machine for serving strips of adhesive tape, a frame or housing having opposite side walls providing a space between them for supporting a package of tape in position to be drawn upon, strip feeding means, strip severing means and guiding means for the strip operatively positioned with respect to the feeding means between said feeding means and the severing means and including a weighted, readily removable member to engage the upper surface of the strip and a co-acting member at the lower surface of the strip.

11. In a machine for serving strips of adhesive tape, a frame or housing having opposite side walls providing a space between them for supporting a package of tape in position to be drawn upon, strip feeding means, strip severing means and guiding means for the strip operatively positioned with respect to the feeding means, said feeding means including a feeding roll, a superimposed co-acting roll, a weighted, removable member between said co-acting roll and the severing means and acting to guide the strip to said severing means.

12. In a machine for serving strips of adhesive tape, a frame or housing having opposite side walls providing a space between them for supporting a package of tape in position to be drawn upon, strip feeding means, strip severing means and guiding means for the strip operatively positioned with respect to the feeding means, said feeding means including a lower feeding roll, a co-acting smaller upper roll mounted in enlarged bearing openings permitting lateral movement of said roll and said guiding means including a weighted, readily removable member between said upper roll and the severing means and adapted to be held in guiding position by lateral movement of said co-acting roll in the feeding movement of the strip.

13. In a machine for serving strips of adhesive tape, a frame or housing having opposite side walls providing a space between them for supporting a package of tape in position to be drawn upon, strip feeding means, strip severing means, and guiding means for the strip operatively positioned with respect to the feeding means, said feeding means including a pair of co-acting feed rolls and the guiding means including a weighted, readily removable member having a concave face adjacent the uppermost feed roll and an opposite plane face adapted to take against a face of the severing means.

14. In a machine for severing strips of adhesive tape, a frame or housing having opposite side walls between which the package or roll of tape may be positioned for feeding movement, strip feeding means, a moistener having a moistener roll in advance of the feeding means, strip severing means and a removable cover adapted to be received between the walls of the frame or housing and provided at its under face with a spring having opposite free ends to engage said opposite side walls and thereby be retained in position.

15. Strip serving mechanism including means to support a strip package, strip feeding means, strip moistening means, automatic strip severing means, and cooperating means for controlling said severing means, whereby a strip of variable length may be manually drawn past the moistening means and be automatically severed by relative movement of the strip and severing means.

16. Strip serving mechanism including means to support a strip package, strip feeding means, strip moistening means, automatic strip severing means, and cooperating means for optionally delaying the action of said severing means whereby a strip of variable length may be manually drawn past the severing means and be automatically severed by automatic release of the severing means.

17. Strip serving mechanism including means to support a strip package, strip feeding means, strip moistening means, automatic strip severng means, and cooperating means for controlling said severing means whereby a strip of variable length may be manually drawn past the moistening means and be automatically severed by release of the severing means through deflection of the strip.

18. Strip serving mechanism including means to support a strip package, strip feeding means, strip moistening means, strip severing means, and cooperating means whereby a strip of variable length may be manually drawn past the moistening means and be automatically severed by release of the severing means through manual deflection of the drawn-out portion of the strip.

19. Strip serving mechanism including means to support a strip package, strip feeding means, strip moistening means, strip severing means, a holding device to hold the severing means away from the served strip, and means to release said holding means, thereby to permit strip severance.

20. Strip serving mechansm including means to support a strip package, strip feeding means, strip moistening means, strip severing means, a holding device to hold the severing means away from the strip, and means adapted to be engaged by the strip upon deflection of the latter to release said holding means, and thereby permit strip severance.

21. Strip serving mechanism including means to support a strip package, strip feeding means, strip moistening means, strip severing means, a holding device to hold the severing means away from the served strip, a member positioned to be engaged by the strip when manually deflected and when moved to release said holding device, thereby to permit the severing means to sever the strip.

22. Strip serving mechanism including means to support a strip package, strip feeding means, strip moistening means, strip severing means, a holding device adapted to hold the severing means in a depressed position away from the strip, a releasing means for said holding device and including a yoke extending transversely of the service path of the strip and positioned to be engaged by the strip upon manual deflection of the latter when sufficient length of strip has been drawn manually from the package.

23. In a strip serving machine, the combination of a support for a supply of strip material, strip feeding means, strip severing means including a movable blade having a normal or rest position clear of the path of the strip, an actuating member for said feeding means having a feeding movement and an opposite or return movement during the latter portion of which it actuates said movable blade to sever the strip, and means enabling said actuating member to move sufficiently in the direction of its feeding movement immediately subsequent to said severing operation to allow the return of said blade to its normal position clear of the path of the tape.

24. In a strip serving machine, the combination of a support for a supply of strip material, means for feeding a strip from said supply, a member having a movement in one direction to actuate said feeding means and a return movement, a spring for effecting said return movement, and means to relieve said member from the direct action of said spring prior to the completion of its return movement thereby permitting said member to throw beyond the point at which it starts its feeding movement and immediately to return thereto.

25. In a strip serving machine having strip feeding mechanism including an operating lever having a feeding movement and a return movement and a spring for effecting the latter, the combination of strip severing means comprising a fixed blade and a blade movable across the service path of the strip by said lever in its return movement, and means whereby said movable blade is automatically removed from said service path subsequent to the severing of the strip.

26. In a strip serving machine having strip feeding mechanism including an operating lever having a feeding movement and a return movement and a spring for effecting the latter, the combination of strip severing means comprising a fixed blade and a blade movable across the service path of the strip by said lever in its return movement, and means whereby said movable blade has a normal or rest position clear of said service path of the strip.

27. In a strip serving machine, the combination of means for supporting the strip supply, strip feeding means, means for actuating said feeding means, strip severing means including a blade swingable across the path of the strip to sever the latter by engagement therewith of said actuating means, connections between said feeding and actuating means permitting a predetermined non-actuating movement of the latter in the direction in which it is moved to actuate the feeding means, and means whereby said non-actuating movement occurs immediately after the strip is severed and whereby said swingable blade is returned to a normal or rest position clear of the path of the strip.

28. In a strip serving machine, the combination of a support for the strip supply, strip feeding means, a lever for actuating the latter, having an actuating and a return movement and capable of a predetermined non-actuating movement in the direction of its said actuating movement, spring means for returning said lever after actuation of said feeding means, and means to arrest said spring means while permitting said lever to complete its return movement and then to perform its said non-actuating movement.

29. In a strip serving machine, the combination of a support for the strip supply, strip feeding means, a lever for actuating the latter having an actuating and a return movement and capable of a predetermined non-actuating movement in the direction of its said actuating movement, spring means for returning said lever after actuation of said feeding means, and a stop 9ᶜ to arrest said spring means before said lever has completed its return movement.

30. In a strip serving machine the combination of a support for the strip supply, strip feeding means, a lever movable in one direction to actuate said feeding means, a spring for returning said lever in the opposite direction, strip severing means including a blade movable by said lever so as to cross the path of the strip, said lever being capable of a predetermined non-actuating movement in the direction of its actuating movement to permit said blade to clear the path of the tape subsequent to the strip severing operation, and means to arrest said spring, while permitting said lever to continue its return movement to operate said blade and then to perform its said non-actuating movement as and for the purpose stated.

31. In a strip serving machine the combination of a support for the strip supply, strip feeding means, a lever movable in one direction to actuate said feeding means, a spring for returning said lever in the opposite direction, strip severing means including a blade movable by said lever so as to cross the path of the strip, said lever being capable of a predetermined non-actuating movement in the direction of its actuating movement to permit said blade to clear the path of the tape subsequent to the strip severing operation and a stop for said spring whereby said lever is relieved therefrom during the last part of its return movement and while moving said blade, so as to permit said lever thereafter automatically to perform its said non-actuating movement to allow said blade to clear the path of the tape.

32. In a strip serving machine the combination of a support for the strip supply, strip feeding means, a lever movable in one direction to actuate said feeding means, a spring for returning said lever in the opposite direction, strip servering means including a blade movable by said lever so as to cross the path of the strip, said lever being capable of a predetermined non-actuating movement in the direction of its actuating movement to permit said blade to clear the path of the tape subsequent to the strip severing operation, and a stop for said spring to relieve said lever therefrom while said blade is still clear of the path of the tape but permitting said lever to continue and to complete the severing operation of said blade and thereafter allowing said lever and blade to assume their said positions in which said stop became effective.

33. In a strip serving machine, means for supporting a package or roll of tape in feeding position, and means to sever a strip fed or drawn therefrom including a fixed blade and a cooperating swingable blade between which blades the strip is fed or drawn, said swingable blade having a cutting edge formed as a wide V whereby severing action is obtained throughout the cutting length of the blade during a smaller arc of swing, enabling said blade more quickly to cross and to clear the path of the tape.

34. In a machine for serving strips of tape, means for supporting a package or roll of tape for feeding movement, tape feeding means in advance of said package, and tape severing means including a fixed blade and a movable blade, the latter having a severing edge which is recessed so as to remove said edge from the normal service path of the strip.

35. Strip serving mechanism including means to support a strip package in feeding position, automatic means to sever a strip fed or drawn therefrom, and cooperating means for controlling said severing means whereby a strip may be drawn manually to the desired length and be automatically severed by relative movement of the strip and severing means.

36. Strip serving mechanism including means to support a strip package in feeding position, strip severing means, a holding device to restrain action of said strip severing means upon the served strip, and a member engageable by the strip by manual deflection of the latter, said member when so engaged being movable to release said holding device thereby to permit the severing means to sever the strip.

37. In a strip serving machine, strip severing means including a fixed blade and a cooperating blade having a normal or rest position clear of the service path of the strip but movable across said path to sever a served strip, a member for operating said blade, said member having a preparatory or cocking movement away from the path of the strip and an opposite, blade-actuating movement, a spring means to effect said blade-actuating movement, and means permitting said member to move sufficiently in the direction of its preparatory movement upon completion of said blade-actuating movement to enable said movable blade to return to its normal or rest position clear of the path of the strip.

38. In a strip serving machine, strip severing means including a fixed blade and a cooperating blade having a normal or rest position clear of the service path of the strip but movable across said path to sever a served strip, a member for operating said blade, said member having a preparatory or cocking movement away from the path of the strip and an opposite, blade-actuating movement, spring means to effect said blade-actuating movement, and means to relieve the tension of said spring means upon said member sufficiently to permit said movable blade to return to its normal or rest position upon completion of its strip severing movement.

In testimony whereof, I have signed my name to this specification.

TREVOR R. GAUTIER